UNITED STATES PATENT OFFICE.

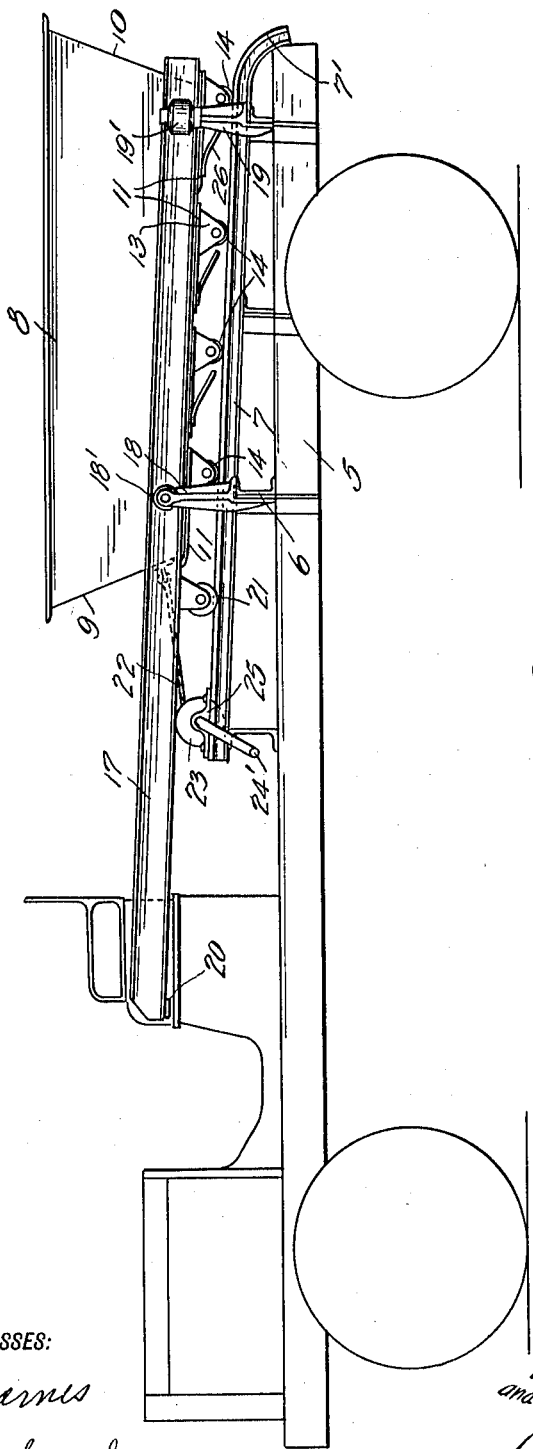

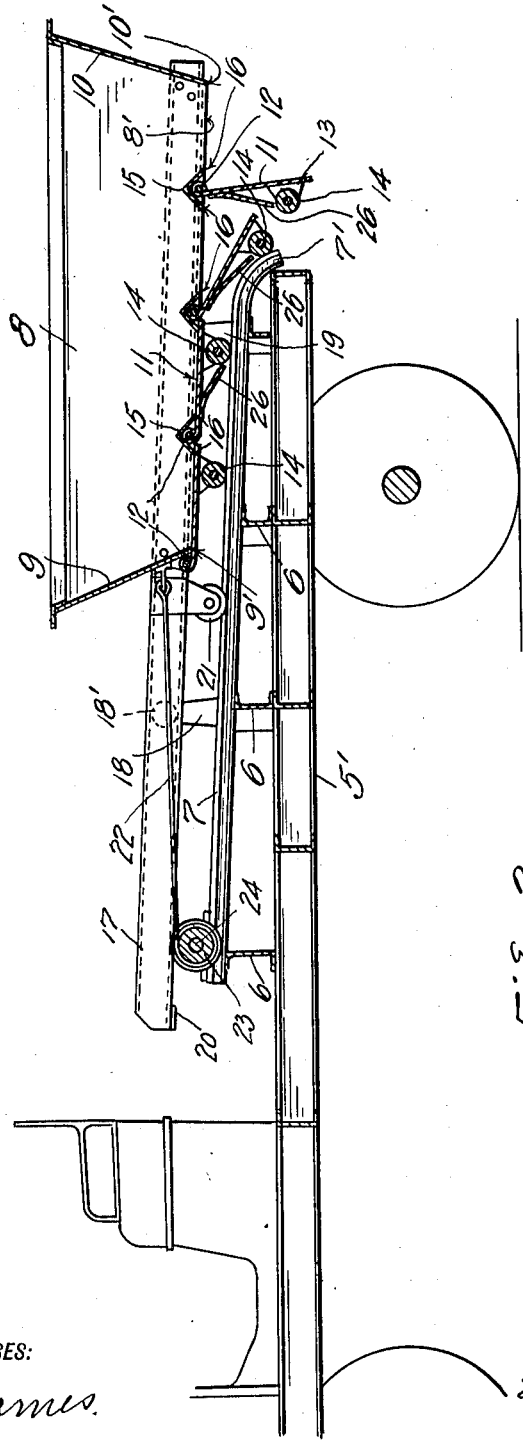

FRED T. SHERMAN AND HERMAN GOETZ, OF SEATTLE, WASHINGTON.

AUTOVEHICLE DUMP-BOX.

1,020,665.  Specification of Letters Patent. Patented Mar. 19, 1912.

Application filed March 7, 1911. Serial No. 612,968.

*To all whom it may concern:*

Be it known that we, FRED T. SHERMAN and HERMAN GOETZ, citizens of the United States, residing at Seattle, in the county of King and State of Washington, have invented certain new and useful Improvements in Autovehicle Dump-Boxes, of which the following is a specification.

This invention relates to vehicles for the conveyance of bulky material, such as sand, plaster, etc., and more particularly, to that class known as automobiles.

The object of our invention is the provision of a body or load receptacle having hinged doors at the bottom which are opened or closed through movements of the receptacle with respect to the vehicle frame which supports the receptacle.

The invention is illustrated in the accompanying drawings, wherein—

Figure 1 is a side elevation and Fig. 2 is a longitudinal vertical section.

In the drawings, 5 and 5' designate the side members of the frame or "chassis" of an automobile. Rigidly secured to the chassis, as by transverse bridge pieces 6, is a plurality of longitudinal rails 7. These rails are desirably arranged to incline downwardly toward the rear and terminate in curved ends 7' which overhang the rear end of the chassis, as shown. Mounted upon the rails is a body or box formed with side walls 8, a front wall 9 and a rear wall 10. The bottom of the box is composed of a number of doors 11 which are hingedly connected at their forward edges to transverse rods 12 secured to the box walls 8. Adjacent their rear ends, said doors are provided with journal bearings 13 for the axles of rollers 14.

15 represent angle-bars, or an equivalent, connecting the side walls 8 of the box and disposed so as to cover the hinge connections of the respective doors. As illustrated in Fig. 2, the flanges of said angle-bars are directed downwardly and have the lower edges 16 thereof in a plane with the lower edges 8', 9' and 10' of the aforesaid box walls, to afford seats against which the various doors are closed.

Rigidly secured to the sides of the box and extending for a distance therein front are channel bars 17.

18 and 19 are brackets for carrying wheels 18' and 19' which track against the webs or flanges of said channel bars and are employed to guide the box movements. The brackets 18 are also located to be encountered by a stop 20 provided near the forward ends of the bars 17 to limit the rear movement of the box when the load carried therein is to be discharged. The wheels 18' likewise coöperate with the flanges of such bars to prevent the tilting of the box.

21 represent traction wheels carried by the bars 17, preferably, to act on rails 7 for supporting the front end of the box, supplemental to the door rollers 14 and the wheels 18'.

A haul-back line 22 is secured to the front of the box and is wound about a drum 23 having its shaft journaled in boxes 25 secured desirably to the rails 7. This shaft may be actuated in any suitable manner as, for example, by means of a crank 24'. Guard plates 26 are desirably secured to the undersides of doors 11 to shield the rollers 14 thereof from the dirt or other material when dumping.

The operation of the invention is as follows: When the box is drawn forward upon the chassis by means of the drum 23 and the line 22, the rollers 14 will successively mount upon the rails 7 to close the respective doors against the edges of the box walls and of the flanges of the bars 15 thus furnishing a closed bottom for the box suitable for retaining a load in the box. To unload the box the latter is moved rearwardly upon the rails 7 and as the door supporting rollers successively run down the curved portions 7' of the respective rails, the unsupported doors will be swung downwardly to afford openings for the discharge of the load through the box bottom at opposite sides of the bars 15. That is to say, as the box is progressively moved back with relation to the rails 7, the rearmost door will first open, the next door will open in turn, and so on until all of the doors are opened and the entire load is accordingly delivered. When this occurs, the box will be protruded beyond the rear ends of the rails and is supported by the engagement of the wheels 18' with the bars 17.

The rear movements of the box are readily accomplished by reason of the inclination of the supporting rails 7, the drum 23 being obviously turned to afford slack to the line 22 while the operator pushes back the box. The opposite movement of the box is effected by turning the drum to draw the box forward through the medium of said line.

The invention is of simple construction and, it is believed, will prove durable and efficient in operation, and will dump the material carried entirely to the rear of the machine and in no danger of fouling the mechanism usually connected with rear axle.

What we claim, is—

1. A dumping vehicle comprising the combination with the body thereof, of a pair of longitudinally-extending rails supported upon said body and having the rear ends thereof curved downwardly, a shiftable receptacle having its bottom formed of a plurality of doors hinged at their forward ends to the receptacle and having their rear ends provided with rollers traveling upon said tracks, a pair of longitudinally-extending guides fixed to the sides of said receptacle and provided with channels, brackets supported by the vehicle body and carrying guide rollers extending in the channels of said guides, said doors dropping to open position when the rollers thereof are clear of said track on a rearward movement of said receptacle, and means connected to the receptacle for pulling the same forward upon said track thereby restoring the doors to closed position.

2. A dumping vehicle comprising the combination with a vehicle body, of a pair of longitudinally-extending inclined tracks supported from said body and having the rear ends thereof curving downwardly, a shiftable receptacle having its bottom formed of a series of doors hinged at their forward ends to said receptacle and provided at their rear ends with collars traveling upon said tracks, guiding means for said receptacle, said doors automatically shifting to open position when the receptacle is moved rearwardly and the rollers of the doors are clear of the tracks, and means for pulling the receptacle forwardly on the tracks causing the rollers to engage the tracks and the moving of the doors to closed position.

3. A dumping vehicle comprising the combination with the body thereof, of a pair of longitudinally-extending rails supported upon said body and having the rear ends thereof curved downwardly, a shiftable receptacle having its bottom formed of a plurality of doors hinged at their forward ends to the receptacle and having their rear ends provided with rollers traveling upon said tracks, a pair of longitudinally-extending guides fixed to the sides of said receptacle and provided with channels, brackets supported by the vehicle body and carrying guide rollers extending in the channels of said guides, said doors dropping to open position when the rollers thereof are clear of said track on a rearward movement of said receptacle, means connected to the receptacle for pulling the same forward upon said track thereby restoring the doors to closed position, and traction rollers carried by said guides and traveling upon said tracks forwardly of said receptacle.

4. A dumping vehicle comprising the combination with a vehicle body, of a pair of longitudinally-extending inclined tracks supported from said body and having the rear ends thereof curving downwardly, a shiftable receptacle having its bottom formed of a series of doors hinged at their forward ends to said receptacle and provided at their rear ends with collars traveling upon said tracks, guiding means for said receptacle, said doors automatically shifting to open position when the receptacle is moved rearwardly and the rollers of the doors are clear of the tracks, means for pulling the receptacle forwardly on the tracks causing the rollers to engage the tracks and the moving of the doors to closed position, and traction rollers carried by said guiding means forwardly of said receptacle and traveling upon said tracks.

FRED T. SHERMAN.
HERMAN GOETZ.

Witnesses:
H. BARNES,
E. PETERSON.

---

Copies of this patent may be obtained for five cents each, by addressing the "Commissioner of Patents, Washington, D. C."